United States Patent [19]
Moriya

[11] Patent Number: 6,078,460
[45] Date of Patent: Jun. 20, 2000

[54] HEAD POSITIONING CONTROL SYSTEM FOR USE IN A DISK DRIVE

[75] Inventor: Kazunori Moriya, Tokyo, Japan

[73] Assignee: Kabushiki Kaisha Toshiba, Kawasaki, Japan

[21] Appl. No.: 08/934,895

[22] Filed: Sep. 22, 1997

[30] Foreign Application Priority Data

Jul. 25, 1997 [JP] Japan ................................. 9-200068

[51] Int. Cl.$^7$ ................................................ G11B 5/596
[52] U.S. Cl. ........................................................ 360/77.04
[58] Field of Search ................................ 360/75, 77.04, 360/77.06, 77.07, 77.08, 135

[56] References Cited

U.S. PATENT DOCUMENTS

| | | | |
|---|---|---|---|
| 5,235,478 | 8/1993 | Hoshimi et al. | 360/78.08 |
| 5,757,574 | 5/1998 | Chainer et al. | 360/75 |
| 5,801,908 | 9/1998 | Akiyama et al. | 360/106 |
| 5,847,907 | 12/1998 | Hashimoto | 360/135 |

*Primary Examiner*—William Klimowicz
*Attorney, Agent, or Firm*—Pillsbury Madison & Sutro LLP

[57] ABSTRACT

A head positioning control system for use with a disk drive having a head unit with separate read and write heads is disclosed. A CPU executes the seek control for moving a head to a target track on the basis of the servo data prerecorded on the disk. After the seek control, the CPU executes the track following control operation for positioning the read head within a range of a target track at the time of read operation and positioning the write head within a range of the target track at the time of write operation on the basis of the positional information based on the servo data and the table information prepared in an EEPROM. The table information includes the positioning control reference information for determining the final set point of the read gap or the write gap in accordance with the read operation or the write operation, respectively, for each track.

9 Claims, 5 Drawing Sheets

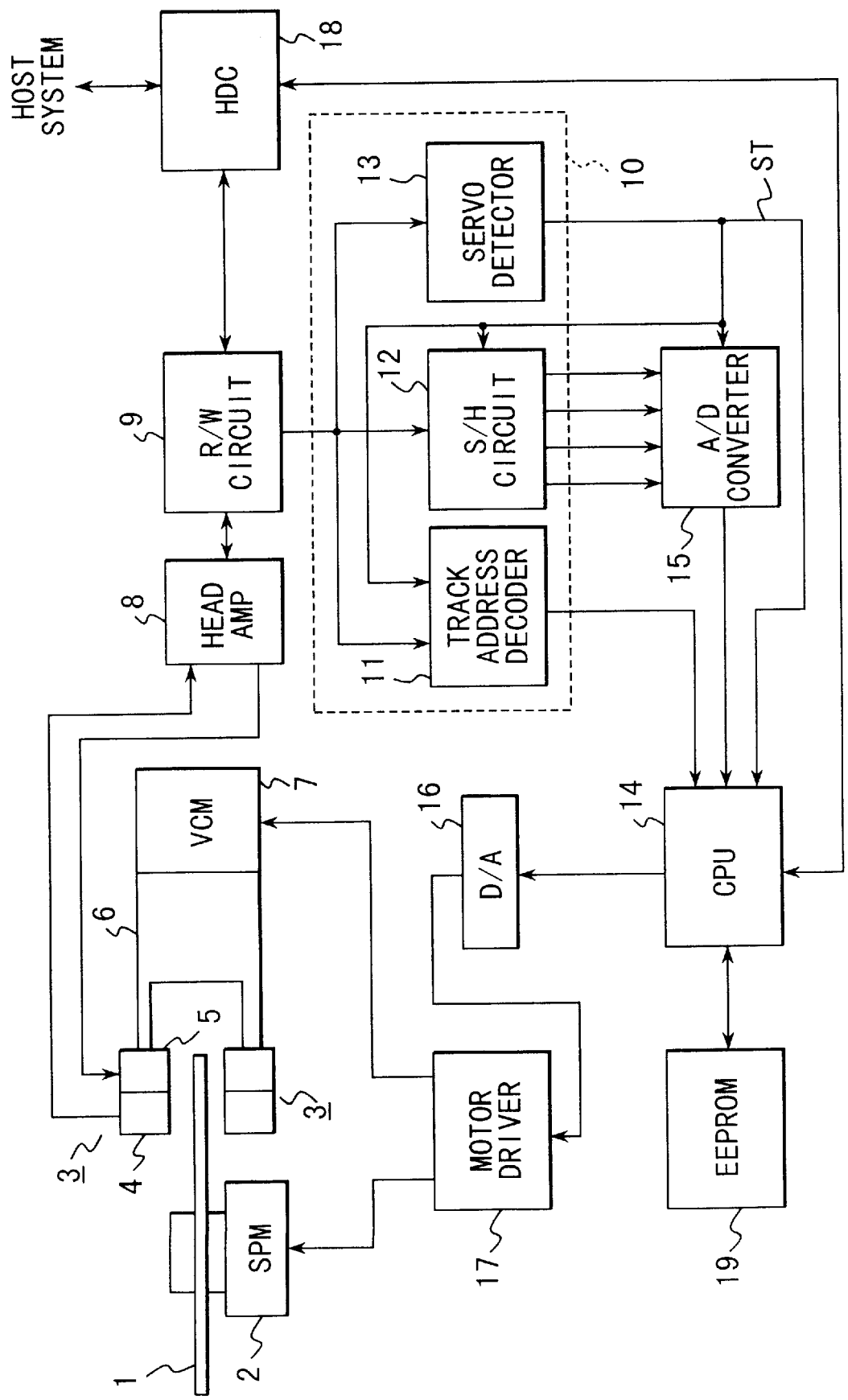
F I G. 1

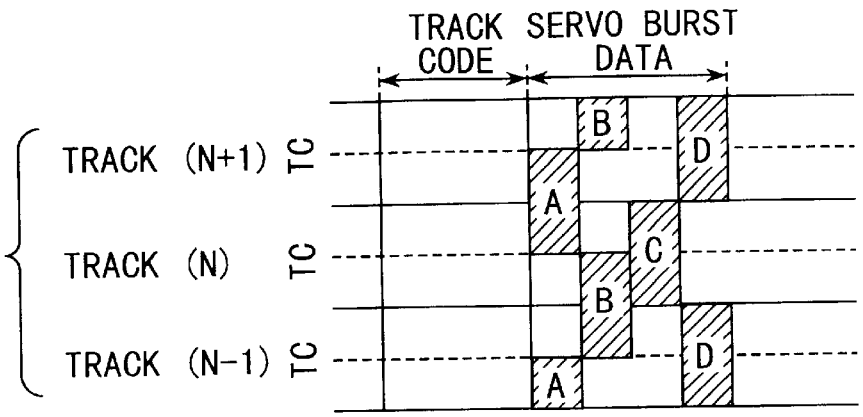
FIG. 2
| TARGET TRACK | R/W MODE | BURST PATTERNS | TRACK CODE | OFFSET VALUE |
|---|---|---|---|---|
| 0 | R | A, B | N−1 | La |
| 0 | W | C, D | N+1 | Lb |
| 1 | R | C, D | N−1 | Lc |
| 1 | W | A, B | N+1 | Ld |
| ⋮ | ⋮ | ⋮ | ⋮ | ⋮ |
FIG. 3
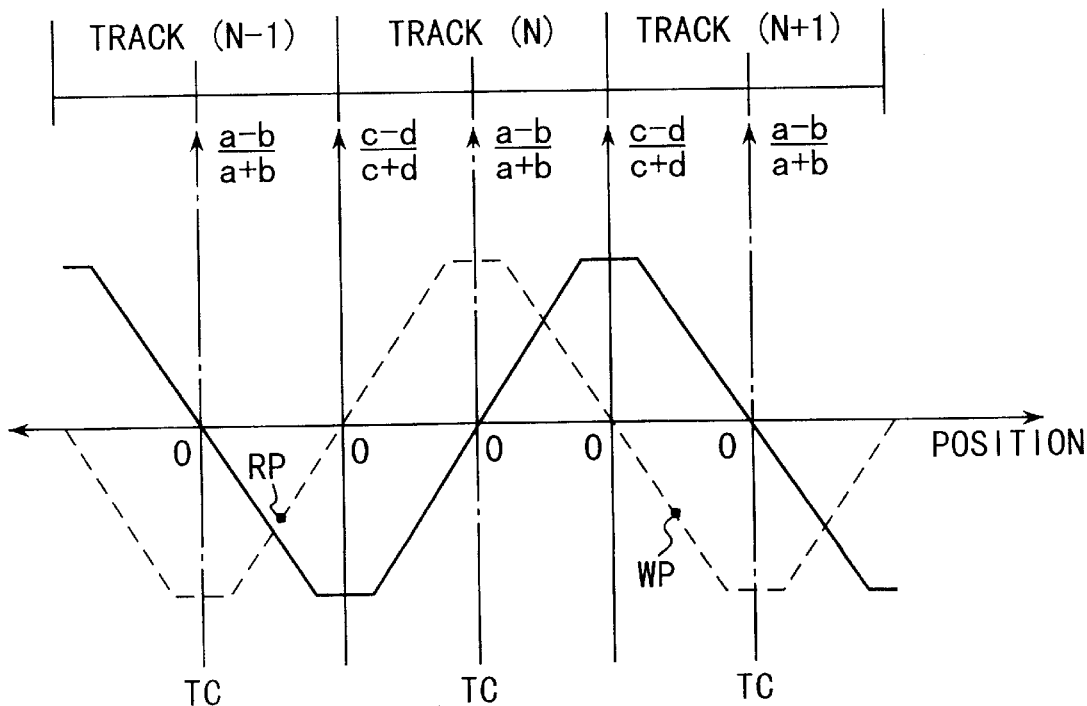
FIG. 4

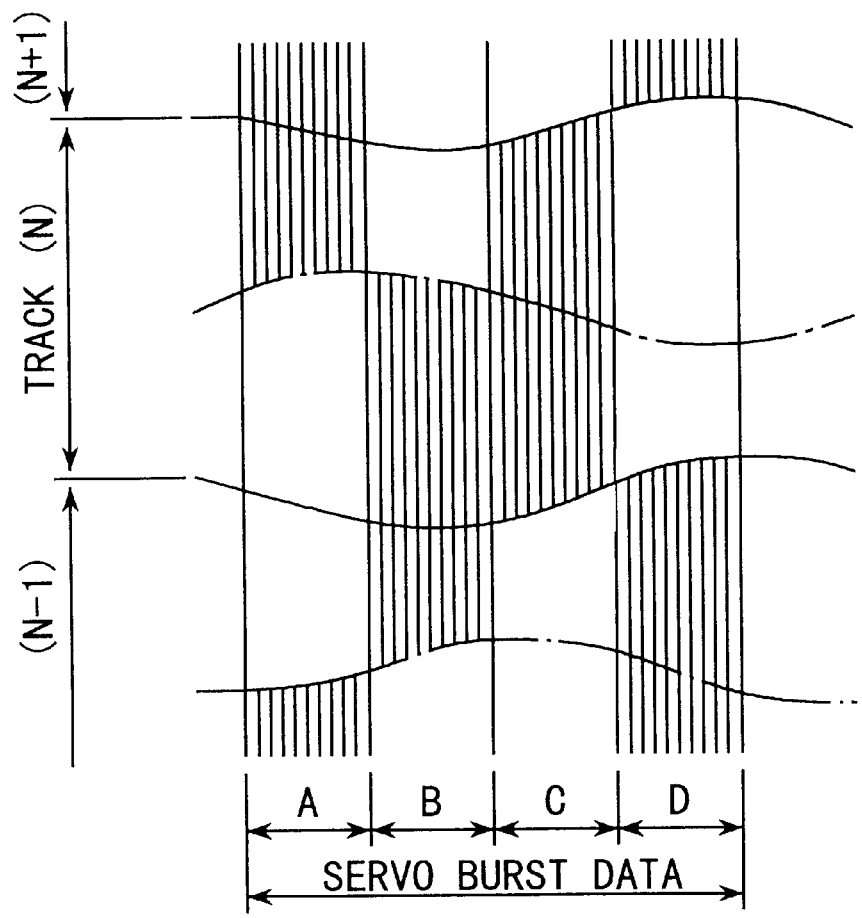
F I G. 5
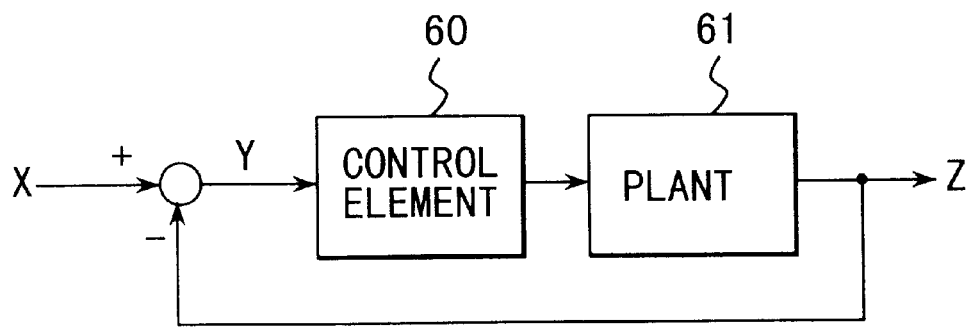
F I G. 6

HEAD POSITIONING CONTROL SYSTEM FOR USE IN A DISK DRIVE

BACKGROUND OF THE INVENTION

The present invention relates to a head positioning control system for use in a hard disk drive for example, in which the positioning control operation of a magnetic head unit separated into a read head and a write head is performed on the basis of the servo data recorded in advance on a disk making up a storage medium.

In conventional hard disk drives (HDD), data are written into and read from a head (magnetic head) on a disk providing a storage medium.

Recently, a head unit separated into a read head and a write head has come to be used in which a MR (magnetoresistive) head is used as the read head in order to realize a high-density data recording. This type of head unit uses an inductive head as the write head, and the write head and the read head are separately mounted on a slider constituting a head unit body. The MR head has a high reproduction output characteristic, and therefore is most suitable as a read head for reading the data recorded in high density on the disk.

A multiplicity of concentric tracks are arranged on each data surface of the disk. Each track is divided into a plurality of data sectors. Further, servo areas having servo data recorded therein are arranged at predetermined intervals on each track. The servo data are roughly divided into track codes (cylinder codes) indicating track addresses for identifying each track and servo burst data (burst patterns A to D). The servo burst data include two-phase burst patterns A, B and C, D for detecting the head position on the track.

Once a target track to be accessed is determined, the head positioning control system (comprising a CPU as a main element) of the HDD first executes the seek control (or speed control) operation for moving the head to the target track using the track code read by the read head. With the approach of the head to the neighborhood of the target track, the head positioning control system executes the track following control operation in which the head (read head or write head) is set in position within the range of the target track (normally, by causing the track center to coincide with the head center) using the track code read by the read head and the servo burst data.

In the track following control operation, the CPU executes the positioning error calculation (a−b)/(a+b) using the amplitude values (assumed to be digital values a, b) of the burst patterns A, B read by the read head and thus calculates the positional information (the positional error or the following error) of the head with respect to the track center. Also, the CPU executes the positional error calculation (c−d)/(c+d) using the amplitude values c, d of the burst patterns C, D thereby to complement the discontinuity of the positional information based on the burst patterns A, B. In this way, the CPU uses the amplitude values c, d of the burst patterns C, D for determining the position of the head not existing on the target track and for detecting the direction in which the head is moved toward the track.

The positional information based on the positional error calculation (a−b)/(a+b), as shown in FIG. 9, undergoes a change along a solid line 80 in accordance with the head position along the track width within the range of a track N, for example. The CPU controls the head position so that the positional error value (a−b)/(a+b) finally becomes zero.

In the case where a read/write inductive head is used as a magnetic head, the CPU executes the position control operation based on the same positional information for both the read and write operations. In the head unit using a MR head as a read head and having separate read and write heads, on the other hand, the CPU is required to execute the positioning control of the read head at the time of the read operation and to execute the positioning control of the write head at the time of the write operation.

With the HDD, as shown in FIG. 8, a mechanism for driving the disk 1 and the head 3 is arranged in a housing 70. A rotary-type actuator (carriage) 6 makes up a drive mechanism for the head 3. The actuator 6 is a mechanism for moving the head 3 in radial direction of the disk 1 by the driving force of a voice coil motor 7. A single or a plurality of the disks 1 are fixed on a spindle motor 2 and rotated at high speed.

The use of this rotary-type actuator generates an angle (skew angle SA) between the normal to a write gap 5a and the tangential direction of disk rotation (corresponding to the track center line TC in the present case) when the write head (write gap 5a), for example, is set in position within the range of a track, as shown in FIG. 10. The skew angle SA changes with the position of the track in which the head exists. Further, since the read gap 4a of the read head is separated from the write gap 5a of the write head, the respective center positions are displaced along the track width and therefore an offset PE is caused. The offset PE changes with the track position of each head at the time of the read or write operation. Also, in this head unit, the manufacturing tolerance is another cause of a displacement of the read gap 4a and the write gap 5a along the track width for lack of a predetermined positional relation between them.

In the HDD, the positioning control is executed using the servo burst data (i.e., the burst patterns A, B) for finally setting the head at a designated position (within the tolerable range of the target track) on the disk. In the head positioning control operation for a head unit having separate read and write heads described above, it is necessary to absorb the displacement (offset PE) along the track width between the read gap 4a and the write gap 5a attributable to the variation in skew angle A and the manufacturing tolerance.

In other words, as shown in FIG. 7A, the read head is required to be positioned in such a manner that the read gap 4a may be included in the range of the data track TD (width of the write gap 5a) providing the data recording area at the time of data read operation. Specifically, the width of the write gap 5a is set wider than the width of the read gap 4a. Also, the center axis of the read gap 4a and the center axis of the write gap 5a are displaced from each other along the track width in the manufacturing process by predicting the change in the skew angle SA. Further, when positioning each head at the time of data read operation and data write operation, the corrective operation is performed to allow an offset along the track width. Specifically, in this offset-allowing corrective operation, as shown in FIG. 7B, the set point RP of the read head at the time of data read operation is located at a different position from the set point WP of the write head at the time of data write operation for the same target track.

For a high recording density of the HDD to be realized, it is also important to increase the track density (tracks per inch (TPI)) on the disk as well as to increase the track recording density (bits per inch (BPI)). In a method of increasing the track density with the write gap 5a set wider than the read gap 4a as described above, the decrease in the track pitch (the track width TW in FIG. 7A) is limited in order to suppress the crosstalks from adjacent tracks. In the case where the width of the write gap 5a (the data track width TD) is decreased in order to relax the limitation of the track pitch for suppressing the crosstalks, on the other hand, an increased offset is required at the time of head positioning control. This is liable to cause the burst patterns A, B to exceed the controllable range and forms a stumbling block to an increased track density.

BRIEF SUMMARY OF THE INVENTION

An object of the present invention is to provide a head positioning control system for use in a disk drive using a twin-head structure including a read head and a write head separate from each other, in which the read head and the write head are set in position as designated thereby to increase the track density of the disk.

In order to achieve the above-mentioned object, according to the invention, there is provided a head positioning control system comprising memory means for storing the table information including the servo data used for controlling the position of the read head or the write head to a target position on the disk, the table information including the positioning control reference information to be referenced at the time of controlling the read head position and the write head position to the same target position as described above. The system further comprises control means for generating positional information indicating the position of the read head or the write head on the basis of the servo data read by the read head at the time of read access or write access, as the case may be, and referencing the table information for the positioning control reference information corresponding to the read access or the write access thereby to perform the positioning control of the read head to the target position at the time of read access and perform the positioning control of the write head at the time of write access on the basis of the positional information and the positioning control reference information. The control means further determines a final set point (offset position) of the read head or the write head when positioning the read head or the write head to a target track corresponding to the read operation or the write operation, respectively, in accordance with the table information and the positional information stored in the memory means (such as EEPROM).

In the case where a positional displacement (offset) exists between the read gap and the write gap along the track width in this system, the read head can be set in position within a tolerable range of the target track without considerably increasing the width of the write gap (width of the data track). As compared with the conventional head unit having separate read and write heads, the width of the data track can be relatively decreased, resulting in a high track density.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the essential parts of a HDD having a head positioning control system according to the present invention;

FIG. 2 is a diagram showing an example of a servo burst data used for the head positioning control system according to the invention;

FIG. 3 is a diagram showing an example of the positioning control table information according to the invention;

FIG. 4 is a diagram showing the relation between the head position and the positional information according to the invention;

FIG. 5 is a diagram showing a modification of the servo burst data used for the head positioning control system according to the invention;

FIG. 6 is a block diagram schematically showing the head positioning control system according to the invention;

DETAILED DESCRIPTION OF THE INVENTION

Figure 7A:
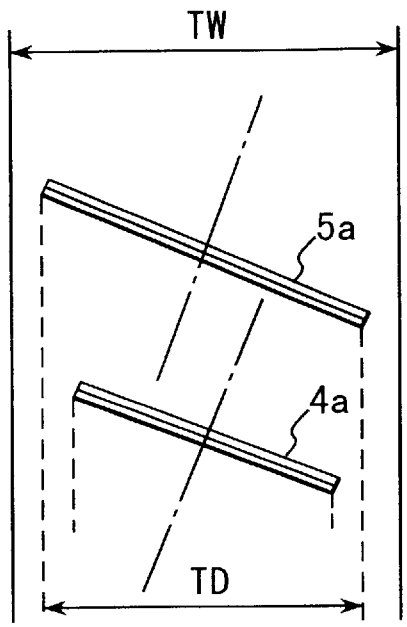
FIG. 7A is a diagram showing relative positions of the read head and the write head in the prior art.
Figure 7B:
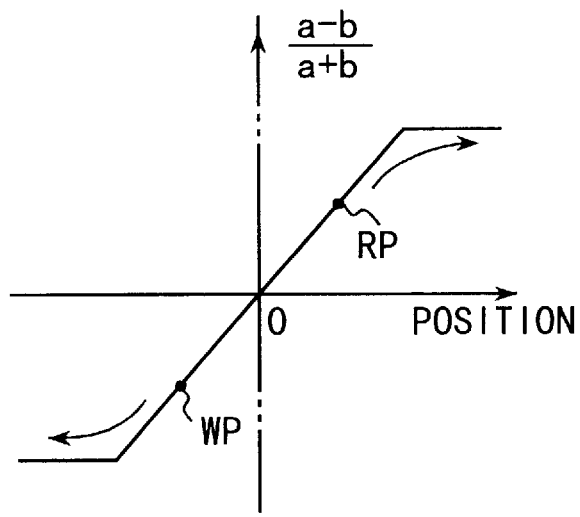
FIG. 7B is a diagram showing the relation between the head position and the servo data in the prior art.
Figure 8:
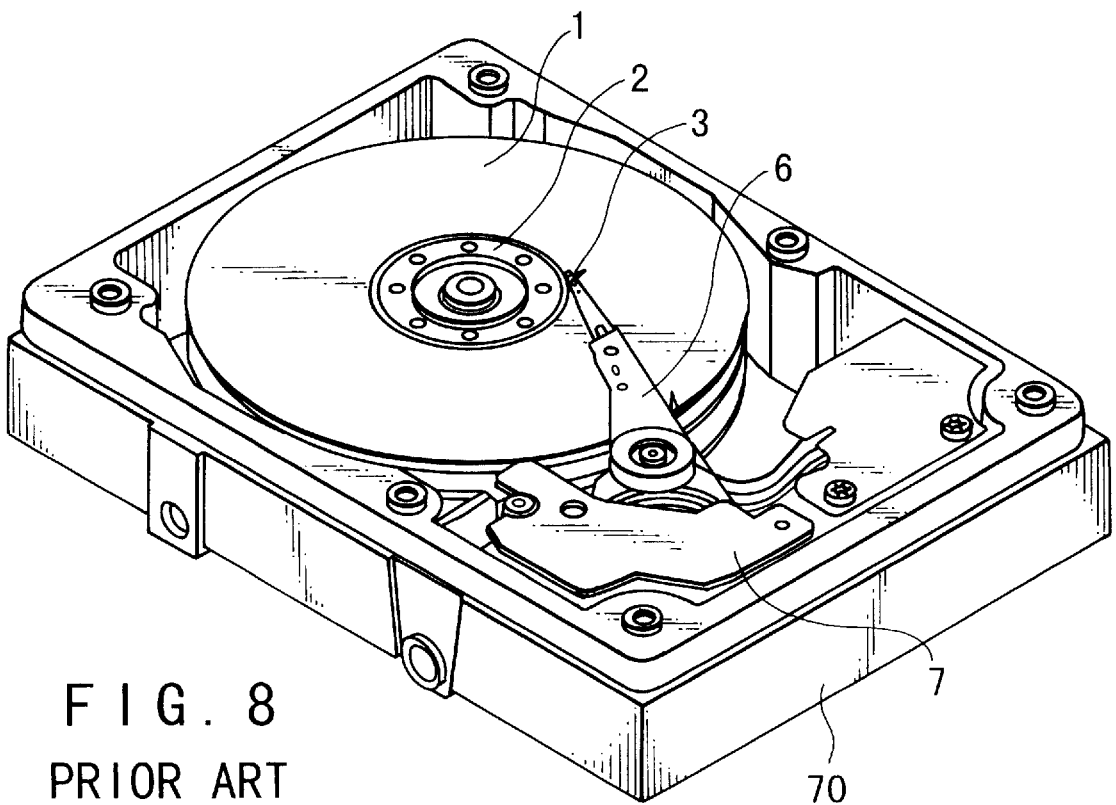
FIG. 8 is a diagram showing a structure of a conventional HDD.
Figure 9:
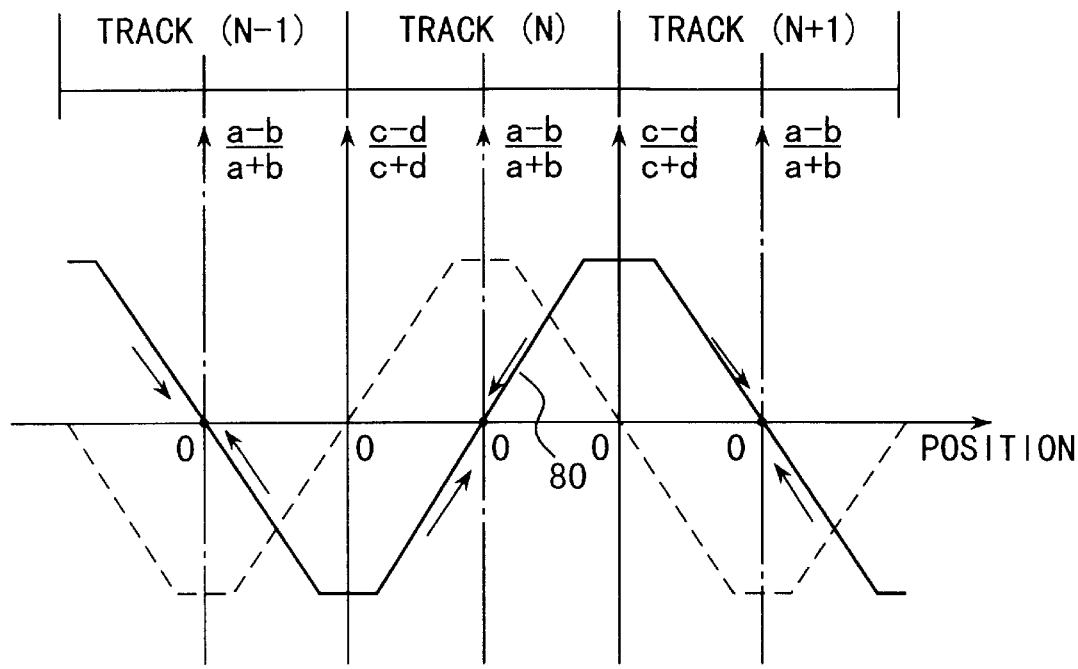
FIG. 9 is a diagram showing the relation between the head position and the positional information in the prior art.

An embodiment of the present invention will be described below with reference to the accompanying drawings. This embodiment assumes a head positioning control system suitable for use with the HDD.

HDD Configuration

The HDD assumed in this embodiment, as shown in FIG. 1, comprises a head unit (magnetic head unit) 3 including a read head 4 and a write head 5, and a disk 1 constituting a storage medium. The MR head constituting the read head 4 of the head unit 3 and an inductive head constituting the write head 5 separate from the MR head are mounted on the same slider.

The head unit 3 is mounted on a carriage mechanism including a head actuator 6 and a voice coil motor (VCM) 7. The head actuator 6 is driven by the driving force of the voice coil motor (VCM) 7 to move the head unit 3 in the radial direction of the disk 1. The disk 1 is mounted on a rotative mechanism including a spindle motor (SPM) and rotated at high speed. Although only a single disk 1 is shown to facilitate understanding, a plurality of disks 1 is normally mounted on the spindle motor 2. Each head unit 3 is arranged for the corresponding data surface of the disk 1.

In addition to the mechanisms such as the head actuator 6 and the spindle motor 2, the HDD includes a head amplifier circuit 8, a read/write (R/W) circuit 9, a servo circuit 10, a CPU 14, an A/D converter 15, a D/A converter 16, a motor driver 17, a disk controller (HDC) 18 and an EEPROM 19.

The head amplifier circuit 8 includes a read amplifier for amplifying the read signal read by the read head 4. The head amplifier circuit 8 also includes a write amplifier for supplying the write head 5 with a write current corresponding to the write data (modulated data). The motor driver 17 is a drive circuit for driving the VCM 7 and the SPM 2 on the basis of a control value (digital value) calculated by the CPU 14. The motor driver 17 is supplied with the control value set in digital value from the CPU 14 after being converted into a voltage signal by the D/A converter 16.

The CPU 14 is a microprocessor making up a main control unit of the HDD. The CPU 14 executes the head positioning control process according to the invention. The EEPROM 19 is a nonvolatile rewritable IC memory for storing the positioning control table information described later. The CPU 14 accesses the EEPROM 19 and references the positioning control table information at the time of head positioning control.

The read/write circuit 9 is a dedicated integrated circuit called a read channel and makes up a signal processing circuit for the read/write signal. The read/write circuit 9 is supplied with the read signal from the read head 3 through the head amplifier 8 and decodes it into the original data (read data) by executing various signal processing operations. The read/write circuit 9 also outputs to the head amplifier 8 the write signal produced by modulating the write data transferred from the HDC 18 according to a predetermined modulation scheme (such as RLL scheme). The head amplifier 8 converts the write signal into a write current and outputs it to the write head 4.

The HDC 18 constitutes an interface between the HDD and a host computer for controlling the transfer of the read/write data and an access command (read/write command) with the host computer. The CPU 14 receives the access command (for read access or write access) from the host computer through the HDC 18 and executes the data access control including the head positioning control with respect to the disk 1.

The servo circuit 10 includes a track address decoder 11, a sample-and-hold (S/H) circuit 12, and a servo detection circuit 13. The servo detection circuit 13 detects a servo area having recorded the servo data therein from the read signal read by the read head 4, and generates a related timing signal ST. The S/H circuit 12 extracts each amplitude value (designated by a to d) of the servo burst data A to D included in the servo data from the read signal processed by the read/write circuit 9. The track address decoder 11 decodes the track code (track address) included in the servo data from the read signal processed by the read/write circuit 9 and outputs it to the CPU 14. The A/D converter 15 converts each amplitude value of the servo burst data A to D into digital values (a to d) and outputs it to the CPU 14. The CPU 14 detects the position of the head unit 3 on the basis of the track code from the track address decoder 11 and the digital values (a to d) from the A/D converter 15.

As described above, the disk 1 has arranged thereon a multiplicity of concentric tracks on each data surface. A plurality of servo areas having recorded therein the track codes and the servo data including the servo burst data A to D therein are arranged at predetermined intervals on each track (FIG. 2).

Head Positioning Control Operation

The head positioning control operation according to the invention will be described below with reference to FIGS. 1 to 4.

First, upon receipt of a command for read access (data read operation) or write access (data write operation) from a host system, the HDC 18 starts controlling the transfer of the read data or the write data, as the case may be. In accordance with this command, the CPU 14 executes the seek control operation for moving the head unit 3 to the target position on the disk 1 to be accessed and the track following control for finally setting the read head 4 or the write head 5 at a target position. The target position means a target track (data track to be accessed) including the data sector that is used to read or write the data to be accessed.

In the seek control operation, the CPU 14 recognizes the track code where the read head 4 of the head unit 3 is located at the present time in accordance with the track code from the track address decoder 11. The read head 4, while moving on the disk 1, reads the track code recorded in the servo area as shown in FIG. 2. The track address decoder 11 is supplied with the read signal read by the read head 4 through the read/write circuit 9, extracts a track address (track code) and outputs it to the CPU 14.

The CPU 14 executes the speed control by acceleration or deceleration in accordance with the distance covered from the detected track position to the target track, and thereby moves the head unit 3 to the target track (or the neighborhood thereof). Specifically, the CPU 14 controls the driving operation of the VCM 7 through the motor driver 17 and thereby controls the motion of the head actuator 6 in the radial direction of the disk 1. In the process, the track address decoder 11 of the servo circuit 10 extracts the track code from the read signal processed by the read/write circuit 9 on the basis of the detection timing (signal ST) of the servo area generated by the servo detection circuit 13 and outputs it to the CPU 14.

The S/H circuit 12, on the other hand, extracts each amplitude value a to d of the servo burst data (burst patterns A to D) from the read signal processed by the read/write circuit 9 on the basis of the detection timing (signal ST) of the servo detection circuits 13. The CPU 14 is supplied with the amplitude values a to d converted into digital values by the A/D converter 15. As described above, the CPU 14 basically executes the positional error calculation (a−b)/(a+b) or (b−a)/(a+b) using the amplitude values a and b of the burst patterns A, B to calculate the positional information for the head position (FIG. 4). Specifically, the CPU 14 detects the position of the head unit 3 (the position within the track range detected by the track code) from the positional information (result of positional error calculation). In other words, the CPU 14 recognizes the positional error of the head unit 3 with respect to a reference position (track center TC) within the range of the target track. If the result of positional error calculation is "0", therefore, it indicates that the head unit 3 is set in position at the track center TC.

Figure 10:
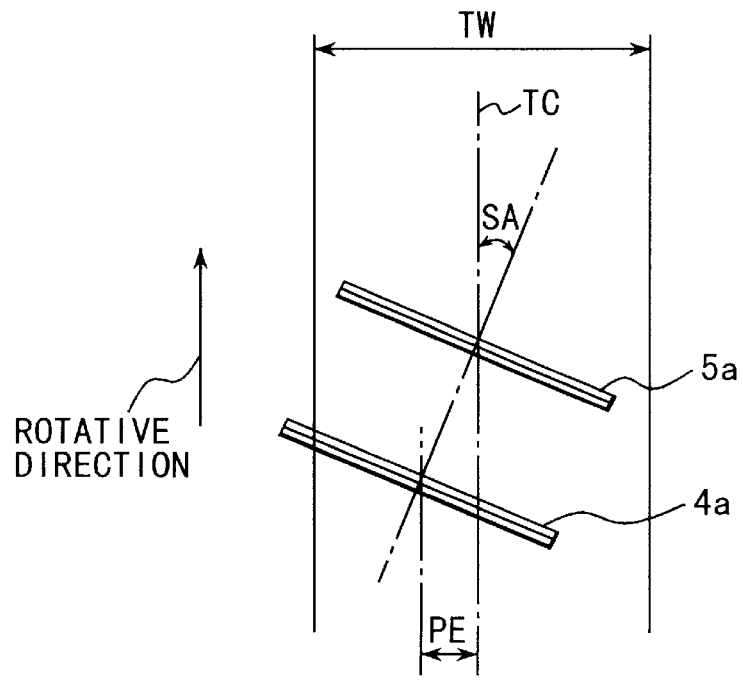
FIG. 10 is a diagram showing relative positions of the read head and the write head in the prior art.

As described above, the head unit 3 having separate read and write heads has the center position of each head displaced along the track width between the read gap and the write gap (in the presence of an offset PE shown in FIG. 10). Also, there exists a skew angle SA. According to this invention, taking into consideration the offset PE between the read gap and the write gap and the skew angle SA, the head unit 3 is set in position at different target positions (the set points constituting the final positions) between the read access (read operation) time and the write access (write operation) time. As a result, the read head 4 can be positioned within the target track range at the time of read operation and the write head 5 can be positioned within the range of the same target track at the time of write operation.

Specifically, the CPU 14 detects the position of the head unit 3 on the basis of the above-mentioned positional information, and determines the set points RP, WP corresponding to the read access or the write access with reference to the table information stored in the memory 19. In the process, the position of the head unit 3 is set actually on the basis of the positional information obtained as of the time when the servo burst data is read by the read head 4.

The EEPROM 19, as shown in FIG. 3, has stored therein the positioning control table information including combinations of burst patterns (A, B or C, D), track codes and the offset value (La, Lb, Lc, Ld, and so on) for indicating the final set point in accordance with the read operation (R mode) or the write operation (W mode) for each target track. The track code means a track address to be reproduced by the read head 4 when the head unit 3 is to be positioned at the final position (set point). Combinations of the burst patterns are for generating the positional information required for positioning the head unit 3. The offset value information is for indicating the set point where the head unit 3 is to be set in position finally on the generated positional information.

Assume that the target track is the track (N) and that the offset PE between the read gap and the write gap exceeds the controllable range by the burst patterns A, B with the center of the track (N) as a boundary (FIGS. 2 and 4). The CPU 14 determines a set point WP on the positional information (c−d)/(c+d) due to the burst patterns C, D having a boundary between the track (N) and an adjacent track (N+1), for example, as shown in FIG. 4 with reference to the table information from the EEPROM 19 at the time of write operation (W mode) based on a command from the HDC 18. Specifically, the write gap of the write head 5 can be set within the range of the track (N) and the data writing operation is executed by determining a set position at the set point WP for positioning the head unit 3 finally. At the time of read operation (R mode) based on a command from the HDC 18, on the other hand, the CPU 14 determines a set point RP on the positional information (c−d)/(c+d) due to the burst patterns C, D with a boundary between the track (N) and the adjacent track (N−1) as shown in FIG. 4. Specifically, the set position for positioning the head unit 3 finally is determined at the set point RP, whereby the read gap of the read head 4 is set within the range of the track (N) and the data read operation is executed.

As described above, according to this embodiment, the HDD using the head unit 3 having separate read and write heads is such that the positioning control table information is stored in the EEPROM 19 in advance for finally positioning the read head (read gap) or the write head (write gap) in accordance with the read or write operation for each track on the basis of the skew angle SA and the displacement (offset PE) along the track width between the read gap and the write gap. The offset PE and the skew angle SA are measured at the time of manufacturing the HDD. On the basis of the measurement, the positioning control table information required for positioning the read gap and the write gap within the range of each track is prepared for each track.

After controlling the movement of the head unit 3 to the neighborhood of the target track, the CPU 14 calculates the position of the head unit 3 based on the servo burst data while at the same time determining the final target position (set point) of the head unit 3 with reference to the positioning control table information. As a result, at the time of read operation, the read gap of the read head 4 can be set in position within the range of the target track to be accessed. At the time of write operation, on the other hand, the write gap of the write head 5 can be positioned within the range of the target track to be accessed. In other words, the CPU 14 can adjust the offset between the read gap and the write gap by referencing the positioning control table information at the time of the track following control and thus can set in position the read gap or the write gap with high accuracy within the range of the target track in accordance with the read or write operation. As a result, the read gap can be positioned within the range of a designated data track without increasing the relative width of the write gap (data track width) in particular. The data track width can thus be narrowed for a higher track density of the disk 1.

This embodiment assumes the case in which the offset between the read gap and the write gap exceeds the controllable range due to the burst patterns A, B with the center of the track (N) as a boundary. Nevertheless, the offset may be expanded further in some cases. In such a case, as shown in FIG. 4, a set point WP is determined on the positional information (a−b)/(a+b) due to the burst patterns A, B in the range of the track (N+1) adjacent to the target track (N), for example, at the time of write operation. At the time of read operation, on the other hand, a set point Rp is determined on the positional information (a−b)/(a+b) due to the burst patterns A, B within the range of the track (N+1) adjacent to the target track (N), for example.

Modification of the Embodiment

FIG. 5 is a diagram showing a servo burst pattern according to a modification of the present embodiment. In this modification, as shown in FIG. 5, the corrective information for the pattern fluctuations (hereinafter referred to as the NRRO corrective information) due to the asynchronous, irregular fluctuation components of the rotative shaft (hereinafter referred to as the NRRO components) included in the disk rotation is added to the table information stored in the EEPROM 19 described above. Specifically, in order to position the read gap or the write gap within the range of the target track in accordance with the read operation or the write operation, as the case may be, the CPU 14 corrects the positional information for determining the set point based on the NRRO corrective information when determining the final target position (set point) of the head unit 3 and executing the positioning control with reference to the table information. As a result, the positional error caused by the fluctuations of the burst patterns due to NRRO can be corrected when executing the positioning control using the positional information including the particular fluctuations of the burst patterns.

Now, an explanation will be given of a cause of the NRRO and a method of extraction thereof.

The servo burst patterns A to D as shown in FIG. 2 are written by the write head 5 with the disk 1 rotated by the SPM 2 and the head unit 3 moved to and fixed at the desired position by an external device called the servo writer in the servo write process of the HDD manufacture.

The rotative motion of the SPM 2 includes the NRRO component making up the asynchronous and irregular fluctuation components of the rotative shaft. As a result, the servo burst patterns A to D formed on the disk 1 proceed to be recorded while containing the fluctuations due to the NRRO component as shown in FIG. 5. In such a case, each boundary of the burst patterns A to D is considered to have an independent fluctuation attributable to the irregular NRRO components.

In the case where independent fluctuations are contained in the burst patterns A to D as described above, the use of different combinations of burst patterns for the read and write operations and hence the execution of the positioning control of the head unit 3 based on the burst patterns having different NRRO components, makes the high-accuracy track following control impossible in the positioning control operation according to the present embodiment. In view of this, according to this modification, the NRRO component is detected in advance at the time of forming a servo burst pattern (at the time of servo write operation), and the positioning control operation is corrected taking this NRRO component into consideration. A specific means consists in adding the NRRO corrective information as information for correcting the fluctuations of the burst patterns due to the NRRO component as the table information according to this embodiment.

In a method of detecting the NRRO component, the head unit 3 is fixed and the intended servo burst data is reproduced after moving the head unit 3 to the target position by the servo writer again upon completion of servo write operation. The NRRO component is estimated from each amplitude value of the servo burst data thus reproduced. Even in the case where the NRRO component is detected with the head unit 3 fixed, the NRRO component for reproducing the servo burst data is observed in overlapped relation with the NRRO component for forming a burst pattern. The NRRO occurs at random, therefore, it is possible to extract the NRRO component for forming the burst pattern accurately by averaging the servo burst data reproduction signal obtained by a plurality of revolutions of the disk 1 for each corresponding servo burst data.

The head unit 3 for extracting the NRRO component can be located at any position where the boundary of a burst pattern including the fluctuations due to the NRRO component for forming the burst pattern can be reproduced over the whole round of a track and thus the NRRO component can be extracted. Also, the position of the head unit 3 can be checked by use of the positional information obtained by reproducing the servo burst pattern formed already on the disk 1 before extraction of the NRRO component of each track. Further, the detection of the NRRO component can be carried out sequentially in the process of servo write operation instead of after a complete servo write operation as described above.

A method of fixing the head unit 3 using the servo writer was explained above as a method of detecting the NRRO component. Now, an explanation will be given of a method of detecting the NRRO component for forming a burst pattern while the head unit 3 follows the track.

Generally, the control system (control loop) for controlling the positioning of the head unit 3 is a feedback system including a control element (transmission characteristic of C) 60 and a control object (transmission characteristic of P) as shown in FIG. 6. In this control system, the relation between the target value (target position) X and the following error Y (=X−Z where Z is an output value) of the head unit 3 is given by equation (1) below.

$$Y = S \cdot X = (1/(1+C \cdot P)) \cdot X \qquad (1)$$

where S is called the sensitivity function.

The following error of the head unit 3 is partly due to the NRRO component for forming a servo burst pattern and partly due to the reproduction of the servo burst data. The NRRO component occurs randomly, and therefore, the following error Y obtained by a plurality of revolutions of the disk 1 is calculated by being averaged for each corresponding servo burst data. As a result, the following error Y attributable to the NRRO component for reproducing the corresponding servo bursts can be separated, so that the following error component due to the NRRO component for forming a servo pattern can be extracted.

Further, the fluctuation component of the target value X attributable to the NRRO component for forming a servo burst pattern, can be separated by multiplying the inverse function of the sensitivity function S by the following error attributable to the NRRO component for reproducing the separated servo burst.

The NRRO corrective information is added to the table information as corrective information for the burst pattern fluctuations based on the NRRO component for forming the servo burst pattern detected by the above-mentioned method. The table information can be prepared either in the process of or after the servo write operation. Alternatively, the NRRO component for forming a servo burst pattern can be detected at predetermined time intervals of the operation of the HDD shipped as a product, and the table information can be updated based on this NRRO component. In this method, the table information can be updated against secular variations of the HDD so that a head positioning control operation with consistently high accuracy can be realized.

As described in detail above, according to this invention, there is provided a head positioning control system for use in a disk drive including separate read and write heads, in which the read gap and the write gap can be positioned within the range of a target track in accordance with the read and write operation, respectively, for each track, even in the case where an offset is present between the read gap and the write gap, by referring to a positioning control table prepared in advance. As a result, the width of the write gap (data track width) in particular is not required to be increased extensively, so that the data track width can be reduced and thereby high-density tracks can be realized.

According to another aspect of the invention, there is provided a head positioning control system configured so that the positioning control table information contains the fluctuation components of the rotative shaft to permit correction of the fluctuations included in the servo information. The rotative motion of the disk by the spindle motor in the disk drive contains an irregularly-generated fluctuation component of the rotative shaft (NRRO) asynchronous with the rotation thereof, with the result that the fluctuations due to the NRRO are contained in the servo information recorded on the disk.

With this configuration, the read head is positioned at a target position by taking into account the NRRO component as well as the track code, the combinations of the burst patterns and the offset value for determining the final set point of the read head by referring to the table information at the time of read access. Also, the write head is set at a target position taking into account the NRRO component as well as the track code, combinations of burst patterns and the offset value for determining the final set point of the write head by referring to the table information at the time of write access. As a result, the track following error due to the NRRO component is reduced and therefore an accurate positioning control operation is realized using the servo information containing the NRRO component at the time of setting the read and write heads at a target position.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A head positioning control system for a disk drive that has a read head, a write head and a disk, the disk being prerecorded with servo data for positioning the read head and the write head, the system comprising:

memory means for storing table information containing the servo data used for positioning the read head or the write head at a target position on the disk, said table information including positioning control reference information adapted to be referenced each time of positioning the read head at said target position and positioning the write head at said same target position; and control means for generating positional information indicating the position of the read head or the write head based on the servo data read by the read head at the time of read access or write access, respectively, referencing said table information for said positioning control reference information corresponding to the read access and the write access, and thereby positioning the read head at said target position at the time of read access and positioning the write head at said target position at the time of write access on the basis of said positional information and said positioning control reference information.

2. The system according to claim 1, wherein the control means positions the read head at a set position within the target position at the time of read access and positions the write head at a set position within the target position at the time of write access on the basis of said positional information and said positioning control reference information.

3. The system according to claim 1, wherein the memory means stores the table information including the positioning control reference information containing track codes where the read head is to be positioned, combinations of burst patterns of servo burst data contained in the servo data, and offset values for a set position within a target track, said table information being stored for a read operation and a write operation separately from each other, and for each target track.

4. The system according to claim 1, wherein the disk has stored therein in advance the servo data including a track address for identifying each track and servo burst data for detecting the position within the range of each track; and the control means controls the movement of the read head and the write head to the neighborhood of a target track on the basis of said track address read by the read head at the time of read access and write access, and positions the read head at a set position to read data from said target track at the time of read access and positions the write head at a set position to write data into said target track at the time of write access on the basis of the servo burst data read by the read head and the positioning control reference information acquired from said table information.

5. The system according to claim 1, further comprising:

extraction means for extracting a fluctuation component of a rotative shaft of the disk contained at the time of recording the servo data on the disk; and means for storing in said memory means the corrective information to be included in said table information for correcting the fluctuation component of said rotative shaft extracted by said extraction means.

6. The system according to claim 5, wherein said extraction means calculates an average value of the same servo data obtained for each of a plurality of revolutions of said disk, and extracts the fluctuation component of the rotative shaft contained at the time of recording the servo data on said disk on the basis of said average value.

7. The system according to claim 4, further comprising:

means for calculating a track following error at the time of positioning the read head or the write head within a tolerable range of said target position on the basis of said servo data;

means for separating a first fluctuation component of a rotative shaft of the disk at the time of recording the servo burst data contained in said track following error from a second fluctuation component of the rotative shaft of the disk at the time of reproducing the servo burst data; and means for storing in the memory means the corrective information to be included in said table information for correcting the separated first fluctuation component of the rotative shaft.

8. A head positioning control system for a disk drive that has a read head, a write head and a disk, the disk being prerecorded with servo data for positioning the read head and the write head, the system comprising:

memory means for storing table information containing the servo data used for positioning the read head or the write head within a tolerable range of a target track on the disk, said table information including the positioning control reference information for positioning the read gap of the read head within a range of said target track at the time of read operation and positioning the write gap within a range of said target track at the time of write operation on the basis of the offset between said read gap of the read head and said write gap of the write head for each track on the disk; and control means for generating positional information indicating the position of the read head or the write head based on the servo data read by the read head at the time of read access or at the time of write access, respectively, referencing said positioning control reference information corresponding to the read access and the write access from said table information in accordance with the target track, and thereby positioning the read gap of the read head within a range of said target track at the time of read access and positioning the write gap of the write head within a range of said target track at the time of write access on the basis of said positional information and said positioning control reference information.

9. The system according to claim 8, wherein the memory means has stored therein in advance the table information including the positioning control reference information for determining a set position of the read head for positioning the read gap of the read head within a range of said target track at the time of read operation and determining a set point of the write head for positioning the write gap of the write head within a range of said target track at the time of write operation for each track on the disk; and the control means moves the read head and the write head to said target track by seek control, and after the seek control, positions said read gap of the read head within a range of said target track at the time of read access and positions said write gap of the write head within a range of said target track at the time of write access on the basis of said positional information and said positioning control reference information.

* * * * *